(12) United States Patent
Messinger et al.

(10) Patent No.: US 7,003,570 B2
(45) Date of Patent: *Feb. 21, 2006

(54) SYSTEM FOR INTEGRATING JAVA SERVLETS WITH ASYNCHRONOUS MESSAGES

(75) Inventors: Adam Messinger, San Francisco, CA (US); Sam Pullara, San Francisco, CA (US); Dave Brown, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 10/264,973

(22) Filed: Oct. 3, 2002

(65) Prior Publication Data

US 2003/0084097 A1 May 1, 2003

Related U.S. Application Data

(60) Provisional application No. 60/327,530, filed on Oct. 5, 2001.

(51) Int. Cl.
*G06F 15/173* (2006.01)

(52) U.S. Cl. ...................... 709/226; 709/203
(58) Field of Classification Search ........ 709/203–207, 709/226; 719/315–319; 707/104.1
See application file for complete search history.

(56) References Cited

U.S. PATENT DOCUMENTS

| | | | |
|---|---|---|---|
| 5,987,454 A | 11/1999 | Hobbs | 707/4 |
| 6,292,792 B1 | 9/2001 | Baffes et al. | 706/45 |
| 6,292,933 B1 | 9/2001 | Bahrs et al. | 717/1 |
| 6,304,906 B1 * | 10/2001 | Bhatti et al. | 709/227 |
| 6,327,628 B1 | 12/2001 | Anuff et al. | 709/311 |
| 6,421,673 B1 * | 7/2002 | Caldwell et al. | 707/10 |
| 6,480,865 B1 | 11/2002 | Lee et al. | 707/523 |
| 6,718,516 B1 * | 4/2004 | Claussen et al. | 715/513 |
| 6,732,330 B1 * | 5/2004 | Claussen et al. | 715/513 |
| 6,779,152 B1 * | 8/2004 | Conner et al. | 715/509 |
| 6,859,451 B1 * | 2/2005 | Pasternack et al. | 370/352 |
| 6,873,984 B1 * | 3/2005 | Campos et al. | 707/6 |
| 2001/0047385 A1 * | 11/2001 | Tuatini | 709/203 |
| 2002/0046286 A1 * | 4/2002 | Caldwell et al. | 709/229 |
| 2002/0049788 A1 * | 4/2002 | Lipkin et al. | 707/513 |
| 2003/0005411 A1 * | 1/2003 | Gerken | 717/120 |
| 2003/0084120 A1 * | 5/2003 | Egli | 709/218 |
| 2004/0015824 A1 * | 1/2004 | Felkey et al. | 717/104 |
| 2004/0073565 A1 * | 4/2004 | Kaufman et al. | 707/101 |

OTHER PUBLICATIONS

Sevlets and JavaServer Pages (JSP) 1.0: A Tutoria, 1999.*
Dr. Herong Yang, Herong's NOtes on JSP Version 3.06, Copyright 2001-2004.*

* cited by examiner

*Primary Examiner*—William C. Vaughn, Jr.
(74) *Attorney, Agent, or Firm*—Fliesler Meyer LLP (57) ABSTRACT

In a traditional application server that uses servlets, when a request is dispatched to a thread the service( ) method of the appropriate servlet is called. When the service( ) method returns the response is sent. This is sub-optimal in the case that an asynchronous event must occur before the response can be sent, because the thread running the servlet must block until the event occurs. The invention provides for asynchronous processing of such requests. In one embodiment, the invention provides an extension to the Servlet API which allows the service( ) method to return (and thus the thread to be freed) before the response is ready to be sent. Then when the asynchronous event later occurs the response may be completed and sent.

20 Claims, 7 Drawing Sheets

(Single Request)

FIGURE 4

(Single Request)

FIGURE 5

(Multiple Requests)
FIGURE 6

(Multiple Requests)
FIGURE 7

SYSTEM FOR INTEGRATING JAVA SERVLETS WITH ASYNCHRONOUS MESSAGES

CLAIM OF PRIORITY

This application claims priority from provisional application "SYSTEM FOR APPLICATION SERVER MESSAGING WITH ASYNCHRONOUS QUEUES", Application No. 60/327,530, filed Oct. 5, 2001, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application and transaction servers and particularly to a system for supporting message queuing and threads with multiple execute queues.

CROSS REFERENCES

This application is related to provisional application "SYSTEM FOR APPLICATION SERVER MESSAGING WITH MULTIPLE DISPATCH POOLS", Application No. 60/327,543, filed Oct. 5, 2001, and Utility Patent Application "SYSTEM FOR APPLICATION SERVER MESSAGING WITH MULTIPLE DISPATCH POOLS", application Ser. No. 10/264,439, Inventors: Adam Messinger and Don Ferguson, filed Oct. 3, 2002, now U.S. Pat. No. 6,886,041, issued Apr. 2, 2005 both of which applications are incorporated herein by reference.

BACKGROUND OF THE INVENTION

The Java 2 Platform, Enterprise Edition (J2EE) specification defines one of the current standards for developing multi-tier enterprise applications. J2EE provides a component-based approach to the design, development, assembly, and deployment of enterprise applications, which both reduces the cost and enables fasten design and implementation. The J2EE platform gives the developer a multi-tiered distributed application model, the ability to reuse components, a unified security model, and flexible transaction control. Not only can they deliver innovative customer solutions to market faster than ever, but the resultant platform-independent J2EE component-based solutions are not tied to the products and application program interfaces (APIs) of any one vendor.

Figure 1:
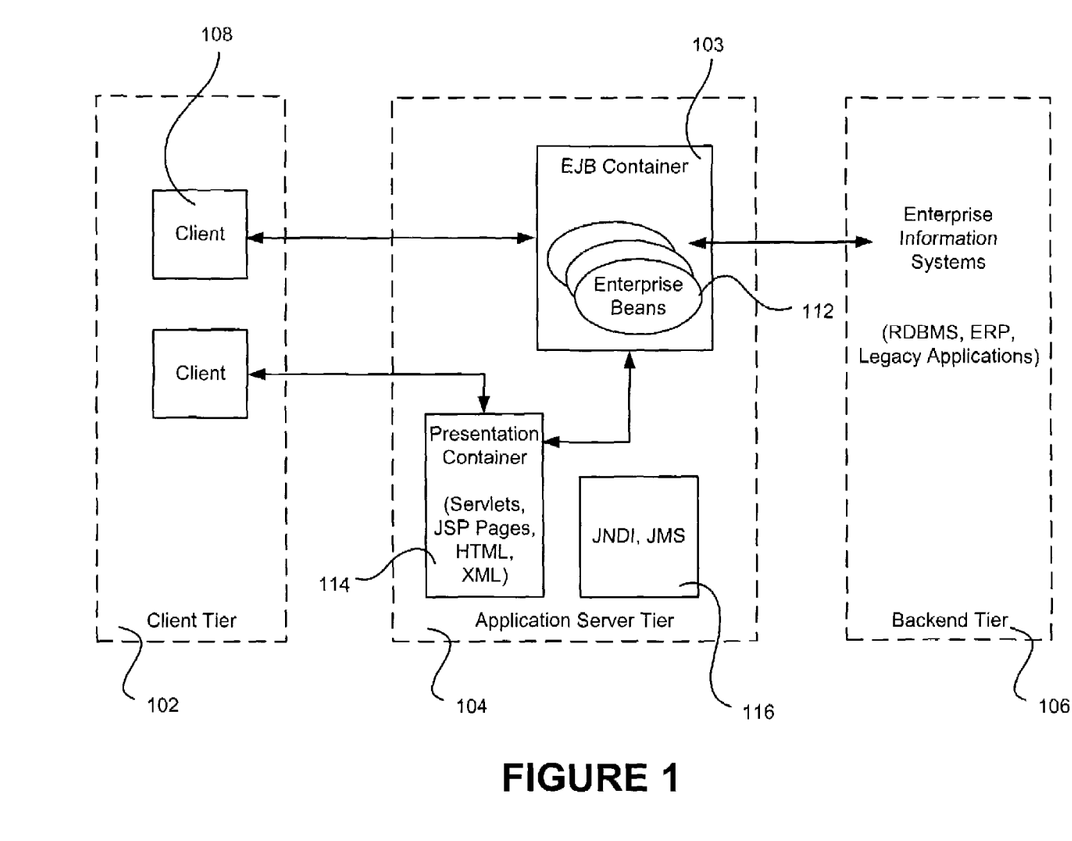
FIG. 1 shows an illustration of a J2EE compatible architecture that can utilize the present invention.

The J2EE specification defines the following kinds of components: application client components; Enterprise JavaBeans (EJB); servlets and Java Server Pages (JSP) (also called Web components); and applets. A multi-tiered distributed application model implies that the application logic is divided into components according to function, and different application components may make up a J2EE application on the same or different servers. Where an application component is actually installed depends on which tier in the multi-tiered J2EE environment the application component belongs. These tiers are depicted in FIG. 1. As shown therein an application server tier 104 is used to develop EJB containers and/or presentation containers such as servlets, JSP, and html pages 114. These in turn are used as an interface between a client tier 102, where the clients 108 and client applications are deployed, and a backend tier 106, used for hosting enterprise or legacy applications such Enterprise Resource Planning (ERP) systems.

Client tier—These can be browsers, Java-based programs, or other Web-enabled programming environments running within the client tier, both inside and outside of corporate firewalls.

Application Server tier—Normally this tier hosts a combination of presentation logic and business logic to support client requests. Presentation logic is supported via JSP pages and servlets that display HTML pages, while business logic is supported via Remote Method Invocation (RMI) objects and EJBs 112. EJBs rely upon the container environment for transactions, lifecycle and state management, resource pooling, security, etc., which together make up the run time environment in which the beans are executed.

Back-end tier—This is generally a combination of existing applications and data stores. It is also referred to as the Enterprise Information Systems (EIS) tier, since it may include such systems as Enterprise Resource Planning (ERP), mainframe transaction processing, database systems, and other legacy information systems.

Since the components of a J2EE application run separately, and often on different devices, there needs to be a way for client and application server tier code to look up and reference other code and resources. Client and application code can, for example, use the Java Naming and Directory Interface (JNDI) 116 to look up user-defined objects such as enterprise beans, and environment entries such as the location of the Java Database Connector (JDBC) DataSource objects, which in turn are used for looking up resources in backend tier, and message connections.

Application behavior such as security and transaction management can be configured at deployment time on Web and enterprise bean components. This deployment time feature decouples application logic from the configuration settings that might vary with the assembly. The J2EE security model lets a developer configure a Web or enterprise bean component so that system resources are accessed only by authorized users. For example, a Web component can be configured to prompt for a user name and password. An Enterprise Bean component can be configured so that only persons in specific groups can invoke certain kinds of its methods. Alternatively, a servlet component might be configured to have some of its methods accessible to everyone, and a few methods accessible to only certain privileged persons in an organization. The same servlet component can be configured for another environment to have all methods available to everyone, or all methods available to only a select few.

Some application servers, such as the WebLogic Server product from BEA Systems, Inc., San Jose, Calif., use an Access Control List (ACL) mechanism that allows for fine-grained control of the usage of components running on the server. Using an ACL, a developer can define at the Java Method level what can, or cannot, be executed by which user or group of users. This ACL mechanism covers anything that runs on the application server except for EJBs, which have their own access control mechanism defined in the EJ B specification. Security realms allow the administrator to import information from existing authorization or authentication systems into the ACL.

Java Servlets

A servlet is a program that extends the functionality of a Web server. A servlet receives a request from a client, dynamically generates the response (possibly querying databases to fulfill the request), and then sends the response containing an HTML or XML document to the client. Servlets are similar to CGI but are typically easier to write, since servlets use Java classes and streams. They execute faster because servlets are compiled to Java byte code and at run time the servlet instance is kept in memory, each client request spawning a new thread. Servlets make it easy to generate data to an HTTP response stream in a dynamic fashion. Each client request is performed as a new connection, so flow control does not come naturally between requests. To allow for this session management maintains the state of specific clients between requests. In some application servers, servlets make use of the HTTP session object to save their state between method requests. This object can be replicated in a clustered environment for fail over purposes.

Java Server Pages

JSP pages are a text-based, presentation-centric way to develop servlets. JSP pages offer all the benefits of servlets, and when combined with a JavaBeans class, provide an easy way to keep content and display logic separate. Both JSP pages and servlets are more desirable than Common Gateway Interface (CGI), because they are platform-independent, and use less overhead. JSP pages can be used with JavaBeans classes to define Web templates for building a Web site made up of pages with a similar look and feel. The JavaBeans class performs the data rendering, so the templates have no Java code. This means they can be maintained by an HTML editor. Simple Web-based application using a JSP page can be used to bind content to application logic using custom tags or scriptlets instead of a JavaBeans class. Custom tags are bundled into tag libraries that are imported into a JSP page. Scriptlets are small Java code segments embedded directly in the JSP page.

Java Messaging Services (JMS)

JMS is the J2EE mechanism used to support the exchange of messages between Java programs. This is how Java supports asynchronous communication, wherein the sender and receiver don't need to be aware of each other and thus can operate independently. JMS supports two messaging models:

Point to point—which is based on message queues. In this model message producer sends a message to a queue. A message consumer can attach itself to a queue to listen for messages. When a message arrives on the queue, the consumer takes it off the queue and responds to it. Messages can be sent to just one queue and will be used by just one consumer. Consumers have the option to filter messages to specify the exact message types they want.

Publish and subscribe—which allows producers to send messages to a topic and for all the registered consumers for that topic to retrieve those messages. In this case, many consumers can receive the same message.

One problem with current Servlet APIs is the completely synchronous programming model. After a request is dispatched to a particular thread the service( ) method of the appropriate servlet is called. When the service( ) method returns, the response is sent. This is a simple programming model which is suitable for many types of work, but is sub-optimal in the case that a asynchronous event must occur before the response can be sent, because the thread running the servlet must block until the event occurs.

SUMMARY OF THE INVENTION

The invention provides a system and method for asynchronous threading which allows the service( ) method to return (and thus allowing the thread to be freed up) before the response is ready to be sent. Then when the asynchronous event later occurs the response may be completed and sent. An example use of this mechanism is the use of JMS in conjunction with servlets.

In accordance with the invention, the process begins when a servlet is executed. The servlet builds a portion of a response, but typically needs more data to complete the response. While it's waiting it queues a JMS message requesting the data and sets the response object aside in a place where it may be found when a JMS message containing the needed data arrives. At this point the servlet may return, but the response will not yet be sent. At a later point in time, when the data arrives via JMS for example, the corresponding response object is retrieved. The remainder of the response can then be generated. When the response is completed it can be explicitly sent to the client.

This feature is also available through the use of a JSP tag library. Using the tags the JSP page author specifies what work should be done before the asynchronous event and which work should be done after the asynchronous event. This feature integrates with the JSP context mechanisms to ensure that they are restored after the asynchronous event and that processing can continue uninterrupted.

DETAILED DESCRIPTION

Broadly described, the invention provides a system and method to allow asynchronous threading. The invention can be incorporated into application server systems that allow access to a servlet via an Application Program Interface (API), or into other systems that benefit from asynchronous threading.

The typical ServletAPIs are completely synchronous. After a request is dispatched to a thread, the service( ) method of the appropriate servlet is called. When the service( ) method returns, the response is sent. This simple programming model is suitable for many types of work, but is sub-optimal in those instances that an asynchronous event must occur before the response can be sent, because the thread running the servlet must block until the event occurs.

In one embodiment, the invention provides an extension to the Servlet API which allows the service( ) method to return (and thus allowing the thread to be freed up) before the response is ready to be sent. Then when the asynchronous event later occurs the response may be completed and sent. One example use of this mechanism is the use of JMS in conjunction with servlets.

In this embodiment, when a servlet is executed, it builds a portion of a response, but then typically needs more data to complete the response. It queues a JMS message requesting the data, and sets the response object aside in a place where it may be found when a JMS message containing the needed data arrives. At this point the servlet may return, but the response will not yet be sent. Later on, when the required data arrives via JMS, the response object is retrieved. The remainder of the response can then be generated, and when completed can be explicitly sent to the client.

The invention is primarily designed for use with application, transaction, and messaging servers, such as the WebLogic family of products from BEA Systems, Inc. At the core of the typical server's design is the threading model, the policy by which threads are assigned to perform work requests. As servlet requests arrive at the server they are dispatched to a thread. This thread is responsible for executing the requested servlet. The server employs a threading model which uses two thread pools an asynchronous pool (often referred to as reader threads) and a synchronous pool (referred to as execute threads). This combination of pools allows a developer or administration to effectively prioritize requests while tolerating user code that performs blocking operations.

Figure 2:
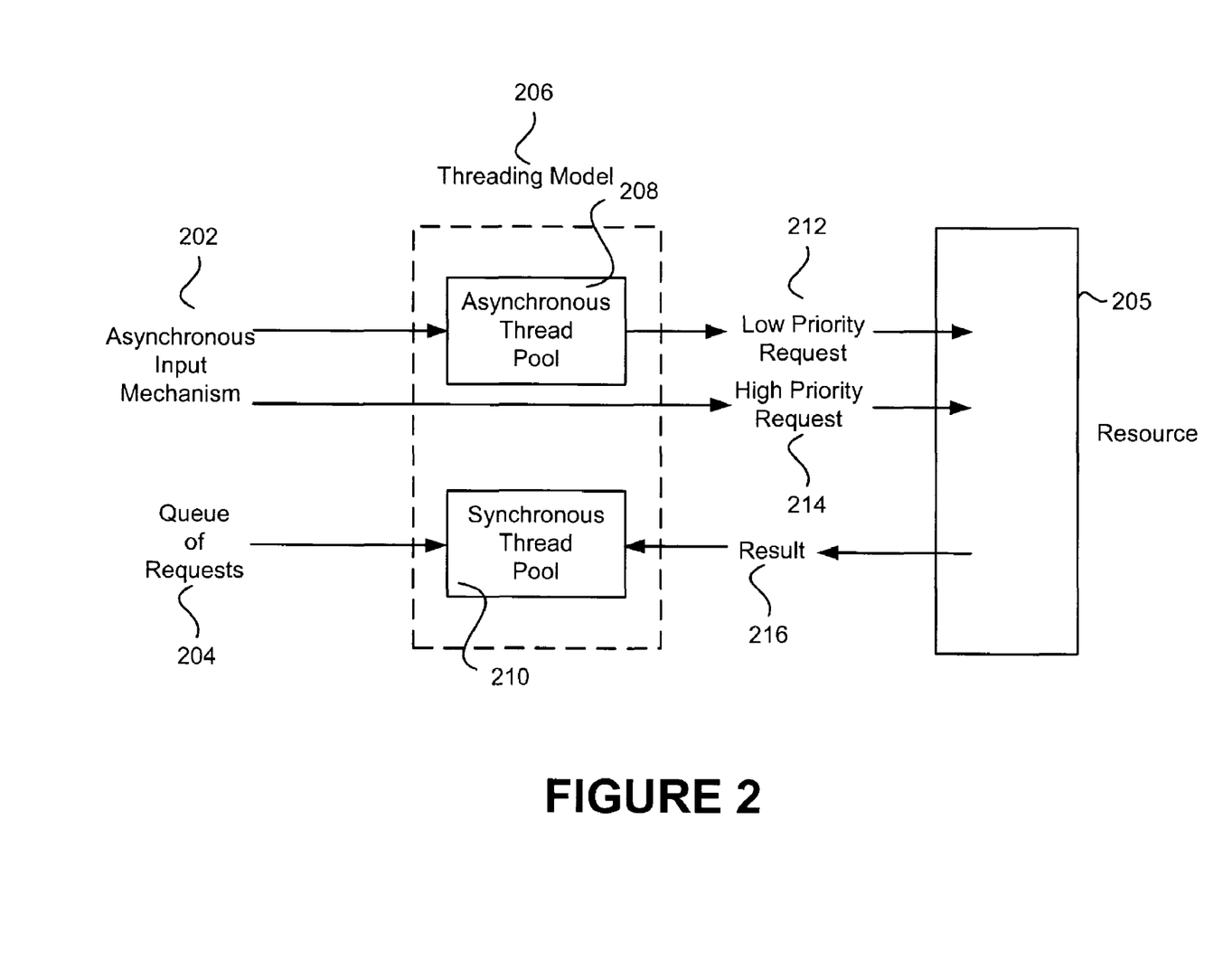
FIG. 2 shows an illustration of a threading policy with asynchronous thread pool in accordance with an embodiment of the invention.

FIG. 2 shows a threading policy mechanism 206 in accordance with an embodiment of the invention. The asynchronous thread pool 208 waits on an asynchronous input mechanism 202 (muxer) for asynchronous read results to become available. Once a result is available a thread from the pool looks at the message and dispatches it by making the appropriate callbacks. The dispatch callbacks usually queue the request for later processing by the synchronous thread pool. However certain non-blocking, priority requests are services directly in the callback. By aggressively accepting input high priority requests 214 do not wait to be read while low priority requests 212 run. Since these threads should never block there are usually a low number of them, perhaps one per processor (CPU).

The synchronous thread pool 210 waits on a queue of requests 204. Once a request is available a thread from the pool processes takes the request from the queue, processes it, and sends out the result 216. While processing the request the thread may execute code, such as sending out the result, which causes the thread to block. The number of threads should therefore be tuned so that there is always one thread per CPU that is in the runnable state. The dispatch policies are described in more detail in provisional application entitled, "SYSTEM FOR APPLICATION SERVER MESSAGING WITH MULTIPLE DISPATCH POOLS", Application No. 60/327,543, Inventor: Adam Messinger, filed Oct. 5, 2001 and copending utility application entitled, "SYSTEM FOR APPLICATION SERVER MESSAGING WITH MULTIPLE DISPATCH POOLS", application Ser. No. Number 10/264,439, Inventors: Adam Messinger and Don Ferguson, filed Oct. 3, 2002.

Figure 3:
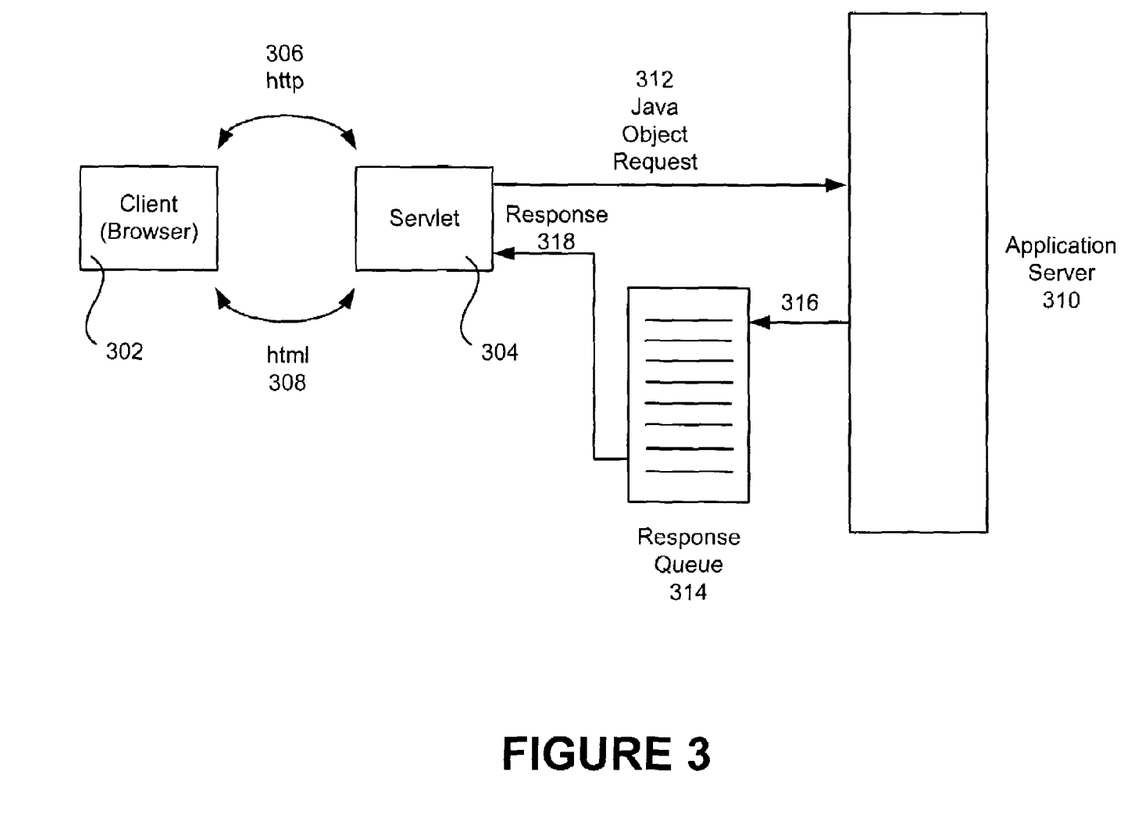
FIG. 3 shows a diagram of a synchronous threading process.

FIG. 3 shows a traditional synchronous message response mechanism. As shown therein, a request from the client application 302, such as for example a Web browser application, is transmitted to the application server via a servlet 304. The request may be in the form of a hypertext transmission protocol (http) request 306, for which the client will typically expect a hypertext markup language (html) response 308. In the synchronous model the thread executes the servlet and then immediately sends the response to the client when execution of the servlet completes. The problem with this approach is that the executing thread is consumed for the entire execution of the servlet. If the servlet is performing tasks which block, perhaps waiting for other data, then this can represent a waste of server resources.

Figure 4:
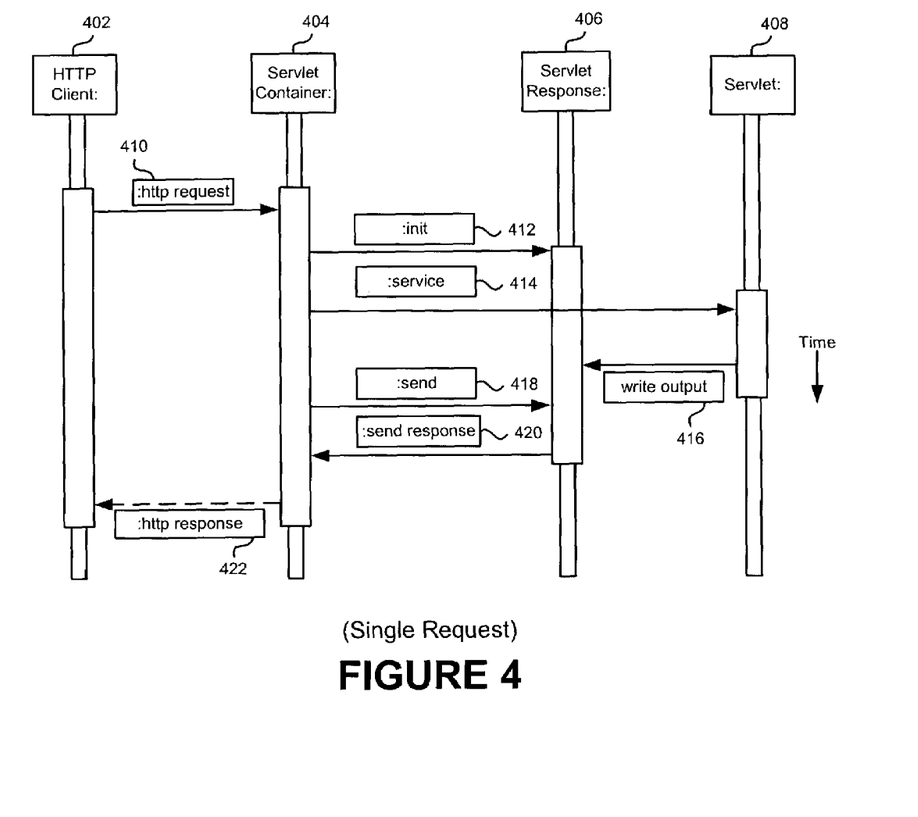
FIG. 4 shows a lifecycle of a single HTTP request that is processed using traditional methods.

FIG. 4 illustrates a typical system lifecycle wherein a client access a resource at a server. As shown in FIG. 4, an HTTP client 402 accesses a servlet 408, which typically runs on a remote web server. It will be evident to one skilled in the art that while HTTP clients are shown herein for purposes of illustration, the invention is not so limited, but may be used with other types of client application. As shown in the lifecycle diagram in FIG. 4, the HTTP client accesses the servlet via a servlet container 404. The servlet container is responsible for receiving the HTTP request 410, and passing it to the servlet 408 for processing. Much of the operation of processing this HTTP request takes place at the servlet response level 406. As illustrated in FIG. 4, with time increasing vertically down the page, the process continues with an :init call 412 to the servlet, which is handled by the response handler 406. The servlet container then passes a :service request 414 to the servlet, to retrieve or to update data for example. A typical use of such a system is in an e-commerce environment, wherein the client application is designed to retrieve catalog listings, such as the results of a search for flight times, etc. The servlet typically responds to the request by writing output 416 to the servlet response handler. This step is often required for buffering, and for optimization purposes. When the servlet container then requests that the response be returned to the client, it sends a :send request 418 to the response handler, and the response handler returns the :send response 420 to the servlet container. The response is then sent as an HTTP response 422 to the client.

Figure 5:
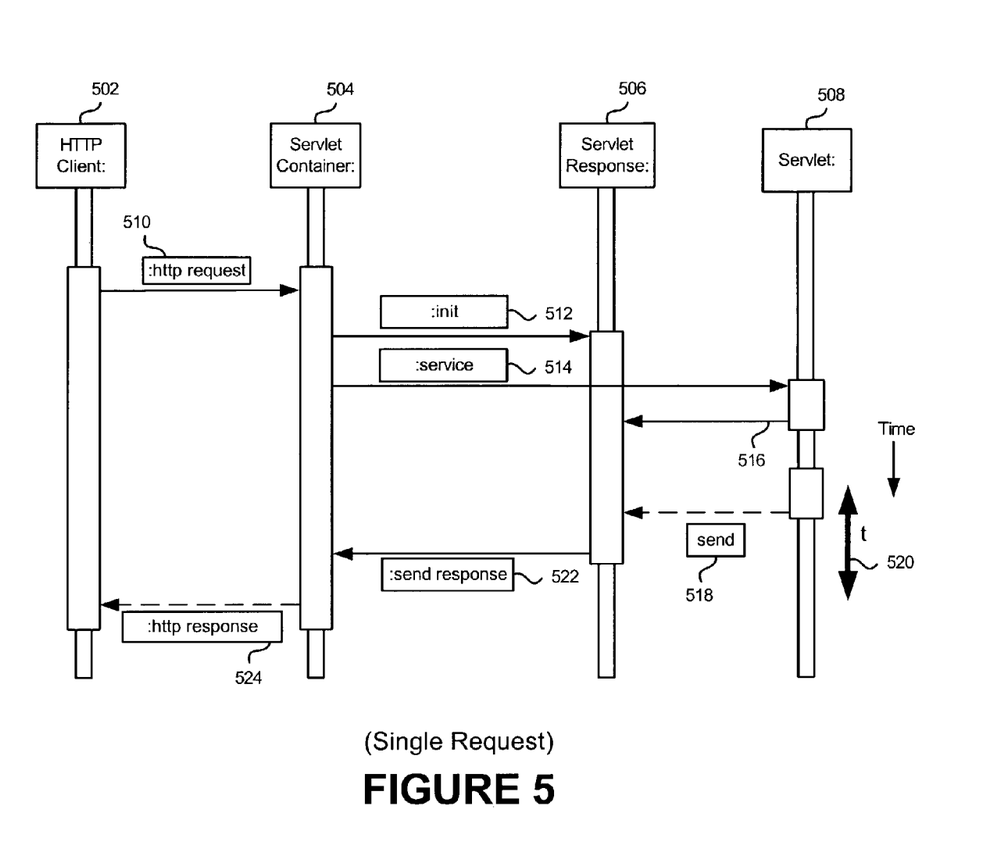
FIG. 5 shows a lifecycle of a single HTTP request processed using asynchronous messaging.

FIG. 5 illustrates a similar life cycle that may be used in accordance with an embodiment of the invention. As shown in FIG. 5, again an HTTP client 502 is used to access a remote server, server resource or servlet 508. The HTTP request 510 is handled by a servlet container 504 which issues an :init request 512 to the servlet response handler 506. This time however, when the :service request 514 is transmitted to the servlet for processing, the servlet returns 516 immediately to the response handler. This immediate return frees up the response handler for handling subsequent requests, in that it does not need to wait for the servlet to actively return data in order to handle those requests. After a period of time t 520, when the servlet has the appropriate data to return to the requests, it sends a :send signal 518 to the response handler, which then sends the :send response 522 to the servlet container. The subsequent HTTP response 524 is transmitted to the client as before.

As part of the process described above, the servlet sets a response code until it has something else to transmit, effectively taking the responsibility for responding away from the container level and placing it at the servlet level. In practice the amount of time that the servlet waits to issue the :send response can be defined as some arbitrary amount, or can be performed as the result of an asynchronous message, for example as the result of receiving a JMS message indicating that the information is available to be transmitted to the client. This type of processing is useful in, for example, e-commerce sites where a user typically experiences a delay time in awaiting search results. When processing is performed according to the invention, instead of merely having a frozen screen, the user may receive some items of information, while other items are returned piecemeal as the servlet finds the appropriate data and returns it. At the same time the servlet response handler is available to handle other client requests. The type of data that is returned immediately, and the type that is returned later, can be specified by the developer.

Figure 6:
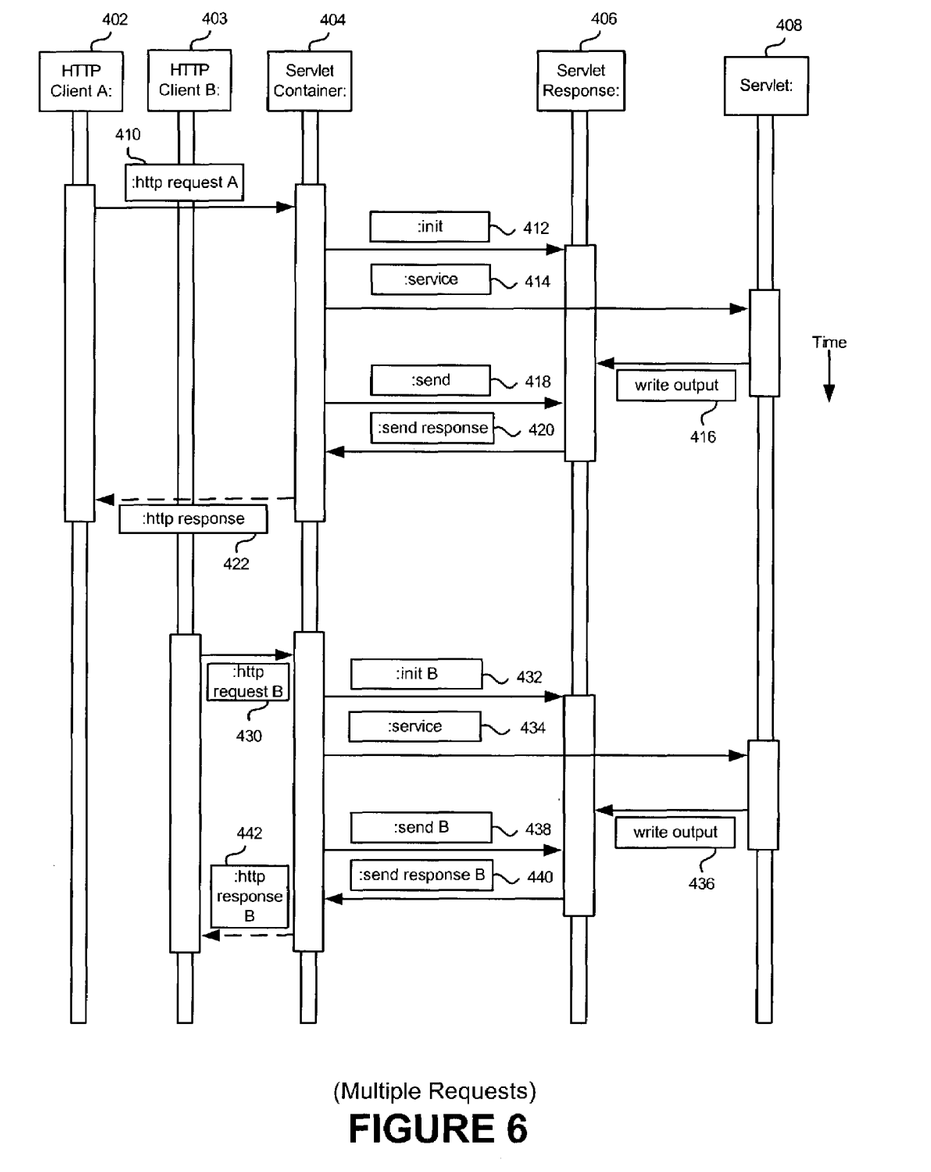
FIG. 6 shows a lifecycle of a plurality of HTTP requests processed using traditional methods.
Figure 7:
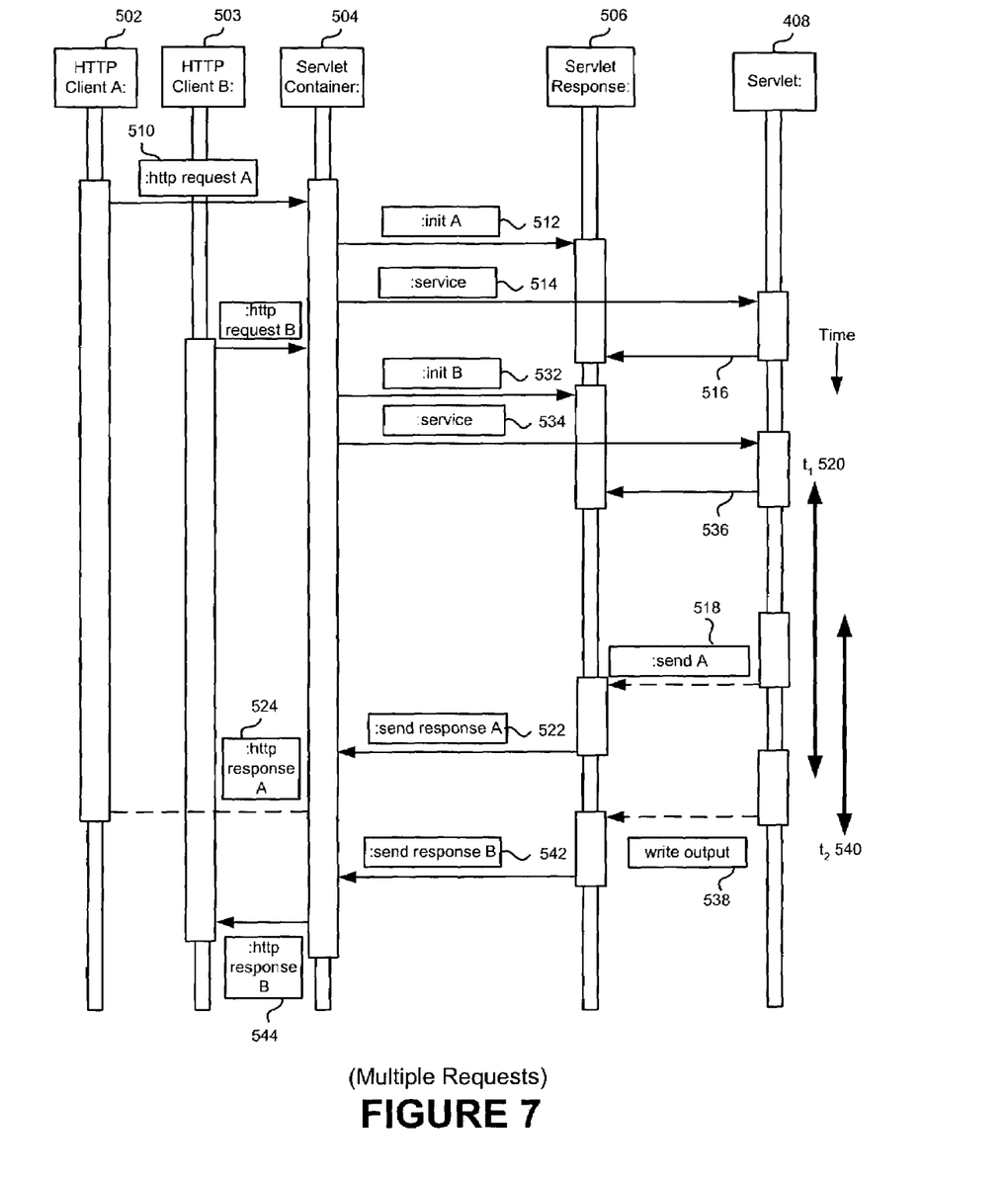
FIG. 7 shows a lifecycle of a plurality of HTTP requests processed using asynchronous messaging.

FIGS. 6 and 7 illustrate in more detail the operation of the invention, as it may be applied to service multiple requests. As shown in FIG. 6, when asynchronous messaging is not used, subsequent requests from clients must be handled in a sequential manner. So, for example, in FIG. 6, a first HTTP request 410 from client A is handled by the servlet container 404 and servlet response handler 406 and completely processed, prior to a second HTTP request 430 from client B 403 being handled. The overall result is one of taking twice as much time to process HTTP requests from the two clients. If the requests were not handled in this sequential manner, it is very likely that one or more requests would create a backlog for other requests such that the user would experience a delay in processing.

FIG. 7 illustrates a life cycle of a mechanism in accordance with an embodiment of the invention in which asynchronous messaging is used to process multiple requests from a single client, and/or requests from multiple clients, in an asynchronous manner, such that the processing can be run in different threads. As shown in FIG. 7, a first HTTP client A 502 and a second HTTP client B 503 access a servlet resource 508 using the mechanisms described above. In accordance with this embodiment, when a first HTTP request A 510 is received at the servlet container, it is handled by the response handler using an :init A call 512, and then passed as a :service request 514 to the servlet 508. The servlet returns 516 immediately to the servlet response handler, which then frees up the response handler for handling other requests. As shown in FIG. 7, a second HTTP request B is handled immediately as an :init B call 532 by the servlet response handler, and passed to the servlet as a :service request 534 for processing. Again, the servlet returns immediately 536. Interleaving the messages in this manner reduces the overall time for processing both requests, and allows the servlet to return information to the client when and if it becomes available. For example, as shown in FIG. 7, when the servlet finds the information necessary to respond to request A it returns that :send response A signal 522 to the servlet container for sending on to the client as HTTP response A 524. A second :send response B signal 542, and HTTP response B 544 is similarly handled in the same way.

Implementation

The file servlet can be replaced by a fast file servlet on platforms that support the asynchronous sending of files over the network. The implementation of this type of servlet requires the addition of asynchronous responses for servlets, which is discussed below.

Synchronous and Asynchronous Responses

When a servlet request from a remote client is serviced a response is often required. This response can either be synchronous, in that it is sent by the same thread that processed the request, or asynchronous in that it is sent later in a different thread. This analysis is from the server's perspective. From the clients perspective either type of response may or may not block waiting for it depending upon how the remote request was made.

Currently most requests are handled in a synchronous manner. When a servlet request is serviced all processing must be completed before the servicing thread can move on to another request. This synchronous model is the one specified by the RMI and servlet specifications. The traditional reason for this is that writing asynchronous code is very difficult and thus prone to error.

There are certain situations where the ability to respond to requests in an asynchronous manner would be very helpful for conserving threads. This is typically true in cases where the server needs to make one or more long running requests of external resources or where the server needs to wait on some condition while processing the request. An example of this is a client request to dequeue from a JMS queue that is currently empty. In a synchronous model the thread servicing the request blocks until there is a message in the queue to return to the client. In an asynchronous model the thread can set the request aside and continue servicing other requests. When a message is placed in the queue the request can be found and a response sent to the client. The invention allows servers to support asynchronous responses to RMI and servlet requests.

Servlets

Particular servlets can be declared as asynchronous in their deployment descriptor. When the service method of an asynchronous servlet returns, no further action will be taken on that request. The servlet is responsible for storing the request someplace such that after some other action takes place it can be retrieved and the response sent. At this point a special send( ) method must be called on the request which will flush the streams, log the request, and, if it is a keep alive connection then register the socket with the muxer to receive more data. It is important to create implementations that ensure resources are appropriately freed by timing out long running requests, thus freeing resources for garbage collection and other cleanup.

JSP

An asynchronous model may also be supported in a similar manner through the use of JSP tag libraries. These tag libraries are used by the http developer/page author to designate which portion of the web page should be executed prior to the asynchronous event and which portion should be executed after the asynchronous event. The tag libraries allow the author to gain access to an object which should be notified when the asynchronous event occurs and JSP page execution should resume.

When using the tag libraries the execution context of the page may be automatically stored before registering for the asynchronous event. In this way it is possible to hide many of the details of asynchronous programming from the JSP author. The JSP need not be concerned about state maintenance. State stored in any of the standard scopes (page, request, session or application) will continue to work as they would using a synchronous JSP.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for asynchronous messaging between Java servlets and an HTTP client, comprising:

a server including a servlet container, a servlet and a servlet response handler;

an HTTP interface at the servlet container that receives requests from, and sends responses to an HTTP client, wherein a request from the HTTP client is transmitted by the servlet container to the servlet; and wherein the servlet assumes responsibility for processing the requests, including receiving a request from the servlet container and immediately returning a partial response data via the servlet response handler to release the servlet response handler from waiting for a complete response, setting a response code to be used with subsequent responses, releasing the response handler to interleave the processing of subsequent requests from the HTTP client or from other HTTP clients, and subsequently processing the original request by locating the required information, resetting the response code, and sending the information to the HTTP client via the servlet response handler.

2. The system of claim 1 wherein the servlet subsequent response is triggered by a response command to send additional response data.

3. The system of claim 2 wherein the response command is a JMS message.

4. The system of claim 1 wherein the functioning of the servlet and servlet response handler is exposed to the user via a JSP tag library.

5. The system of claim 4 wherein the JSP tag library is used to indicate which HTTP response data should be returned immediately and which response data should be returned later.

6. The system of claim 4 further comprising support for JSP execution contexts.

7. The system of claim 1 wherein the system includes an extension to the http interface that allows a service( ) method to return, and allows the thread handling that service( ) method to be freed-up before the response is ready to be sent.

8. The system of claim 1 further including a Java Messaging Service, wherein when a servlet is executed, it builds a portion of a response, queues a JMS message requesting the data, and creates a response object as the response code, which is later retrieved when another JMS message containing the requested data arrives.

9. The system of claim 1 wherein the system sets a period of time t for which to send subsequent responses, after which period of time t the servlet sends a send signal to the response handler, which then sends a send-response signal to the servlet container to send the response to the client.

10. The system of claim 1 wherein the system is used to provide information within a search function to a user of a web page, and wherein the system provides partial items of information to the user's screen, while other items of information are returned successively to the user's screen as the servlet finds the appropriate data and returns it.

11. A method for asynchronous messaging between Java servlets and an HTTP client, comprising the steps of:

receiving a request from an HTTP client to access a servlet contained in a servlet container; and responding to said requests asynchronously, including the steps of receiving a request at the servlet from the servlet container and immediately returning a partial response data via a servlet response handler to release the servlet response handler from waiting for a complete response, setting a response code to be used with subsequent responses, releasing the response handler to interleave the processing of subsequent requests from the HTTP client or from other HTTP clients, and subsequently processing the original request by locating the required information, resetting the response code, and sending the information to the HTTP client via the servlet response handler.

12. The method of claim 11 wherein the servlet subsequent response is triggered by a response command to send additional response data.

13. The method of claim 12 wherein the response command is a JMS message.

14. The method of claim 11 wherein the functioning of the servlet and servlet response handler is exposed to the user via a JSP tag library.

15. The method of claim 14 wherein the JSP tag library is used to indicate which HTTP response data should be returned immediately and which response data should be returned later.

16. The system of claim 14 further comprising support for JSP execution contexts.

17. The method of claim 11 further comprising providing an extension to the http interface that allows a service( ) method to return, and allows the thread handling that service( ) method to be freed-up before the response is ready to be sent.

18. The method of claim 11 further comprising using a Java Messaging Service, including wherein when a servlet is executed, building a portion of a response, queuing a JMS message requesting the data, and creating a response object as the response code, which is later retrieved when another JMS message containing the requested data arrives.

19. The method of claim 11 further comprising setting a period of time t for which to send subsequent responses, after which period of time t sending by the servlet a send signal to the response handler, which then sends a send-response signal to the servlet container to send the response to the client.

20. The method of claim 11 wherein the method is used to provide information within a search function to a user of a web page, and wherein the method provides partial items of information to the user's screen, while other items of information are returned successively to the user's screen as the servlet finds the appropriate data and returns it.

* * * * *